US 9,923,647 B1

(12) United States Patent
Olgaard et al.

(10) Patent No.: US 9,923,647 B1
(45) Date of Patent: Mar. 20, 2018

(54) METHOD FOR ENABLING CONFIRMATION OF EXPECTED PHASE SHIFTS OF RADIO FREQUENCY SIGNALS EMITTED FROM AN ANTENNA ARRAY

(71) Applicant: LitePoint Corporation, Sunnyvale, CA (US)

(72) Inventors: Christian Volf Olgaard, Saratoga, CA (US); Zhiyong Huang, Fremont, CA (US); Yen-Fang Chao, Pleasanton, CA (US); Roman Schilter, Zurich (CH); Stefan Kildegaard Klukowski, Sunnyvale, CA (US)

(73) Assignee: LitePoint Corporation, Sunnyvale, CA (US)

( * ) Notice: Subject to any disclaimer, the term of this patent is extended or adjusted under 35 U.S.C. 154(b) by 0 days.

(21) Appl. No.: 15/381,618

(22) Filed: Dec. 16, 2016

(51) Int. Cl.
*H04B 7/06* (2006.01)
*H04B 17/12* (2015.01)

(52) U.S. Cl.
CPC .......... *H04B 17/12* (2015.01); *H04B 7/0613* (2013.01)

(58) Field of Classification Search
CPC ............................ H04B 17/12; H04B 7/0613
See application file for complete search history.

(56) References Cited

U.S. PATENT DOCUMENTS

2012/0106659 A1* 5/2012 Fireaizen ............ H01Q 3/2647
375/259
2016/0345286 A1* 11/2016 Jamieson ................ H04B 17/12
2017/0230924 A1* 8/2017 Wolberg ............ H04W 56/004

* cited by examiner

*Primary Examiner* — Jaison Joseph
(74) *Attorney, Agent, or Firm* — McCracken & Gillen LLC

(57) ABSTRACT

A method for enabling confirmation of expected phase shifts of radio frequency (RF) signals emitted from respective elements of an antenna array, such as a phased array antenna used for providing directional RF signal radiation patterns needed for beamforming. As a RF signal transmitted via an antenna element of the antenna array is shifted, e.g., stepped, in phase, the resulting received RF signal is monitored. Following detection of a phase shift, a sample of the received RF signal is captured and stored, e.g., for subsequent analysis, such as comparison with one or more expected signal phase differences to characterize the directivity of the transmitted signal.

20 Claims, 3 Drawing Sheets

METHOD FOR ENABLING CONFIRMATION OF EXPECTED PHASE SHIFTS OF RADIO FREQUENCY SIGNALS EMITTED FROM AN ANTENNA ARRAY

BACKGROUND

The present invention relates to testing of radio frequency (RF) signal transmitters designed to perform beamforming, and in particular, to detecting phase shifts of RF signals emitted from elements of an antenna array for comparison with expected signal phase differences.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

Testing of such wireless devices typically involves testing of the receiving and transmitting subsystems of the device under test (DUT). The testing system will send a prescribed sequence of test data packet signals to a DUT, e.g., using different frequencies, power levels, and/or signal modulation techniques to determine if the DUT receiving subsystem is operating properly. Similarly, the DUT will send test data packet signals at a variety of frequencies, power levels, and/or modulation techniques for reception and processing by the testing system to determine if the DUT transmitting subsystem is operating properly.

For testing these devices following their manufacture and assembly, current wireless device test systems typically employ testing systems having various subsystems for providing test signals to each device under test (DUT) and analyzing signals received from each DUT. Some systems (often referred to as "testers") include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Wireless devices, such as cellphones, smartphones, tablets, etc., make use of standards-based technologies, such as IEEE 802.11a/b/g/n/ac/ad ("Wi-Fi"), 3GPP LTE, and Bluetooth. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

More particularly, the IEEE 802.11ad standard provides specifications for wireless communications using millimeter wave frequencies centered nominally about 60 GHz. At those frequencies, signal attenuation is quite pronounced relative to lower-frequency Wi-Fi standards, such as 802.11n. Thus, omni-directional signal radiation is problematic. Instead, devices that subscribe to IEEE 802.11ad generally employ beamforming to obtain directional signal gain. Two devices establishing an 802.11ad link are designed to work cooperatively to determine a signal path producing an optimal signal-to-noise ratio (SNR) prior to sending data packets containing payload data. At least one of such two devices will have the ability to beamform to achieve that optimal signal path. A common way of achieving this is for the beamforming device to use an antenna array in which each antenna element can have its transmitted signal phase shifted in predetermined increments (e.g., of 90 degrees thereby producing four distinct phases, or 11.25 degrees thereby producing 32 distinct phases). When antenna elements emit their transmit signals at particular phase shifts, this changes how the signal radiating from that element will interact with signals radiating from other elements. In essence, where these signals meet in space, they will undergo constructive (additive) or destructive (subtractive) interference. The resulting aggregation of such instances of interference determines the net signal gain realized from one device to the other. By appropriate adjustment of such phase shifts, an optimal effective SNR can be achieved between the two devices.

During manufacturing, a device designed for controlled shifting of signal phases that drive an integral or external antenna array, may experience a manufacturing defect that negatively affects in part or completely the ability of the device to shift phases and to beamform. Hence, during manufacturing test, sufficient testing may determine whether a device is properly shifting phases of the signals driving and being radiated from the antenna array elements, as well as whether the resulting effective radiated signal power stays within the applicable specification.

However, testing each device for each phase shift on each antenna element typically requires a relatively significant amount of test time. Therefore, it would be desirable to have a technique that reduces start and stop control and supports a continuous signal flow as phase shift adjustments were made along with the detection of phase-shift instances and captures of signal characteristics before and after such phase changes. This would decrease required test times and result in commensurately lower testing costs.

SUMMARY

A method for enabling confirmation of expected phase shifts of radio frequency (RF) signals emitted from respective elements of an antenna array, such as a phased array antenna used for providing directional RF signal radiation patterns needed for beamforming. As a RF signal transmitted via an antenna element of the antenna array is shifted, e.g., stepped, in phase, the resulting received RF signal is monitored. Following detection of a phase shift, a sample of the received RF signal is captured and stored, e.g., for subsequent analysis, such as comparison with one or more expected signal phase differences to characterize the directivity of the transmitted signal.

In accordance with one embodiment of the presently claimed invention, a method for enabling confirmation of expected phase shifts of radio frequency (RF) signals emitted from respective elements of an antenna array, including:

receiving a RF signal emitted from one of a plurality of antenna elements of an antenna array;

detecting a phase shift in the received RF signal and in response thereto sampling the received RF signal to produce a RF signal sample;

repeating the detecting and sampling of the received RF signal to produce a plurality of RF signal samples, wherein said received RF signal includes a plurality of predetermined signal phase shifts and each one of the plurality of RF signal samples has associated therewith a signal phase relative to a signal phase of one or both of a prior RF signal sample and a subsequent RF signal sample; and measuring a signal phase difference between each one of the plurality of RF signal samples and one or both of the prior RF signal sample and the subsequent RF signal sample for comparison with one or more expected signal phase differences.

In accordance with another embodiment of the presently claimed invention, a method for enabling confirmation of expected phase shifts of radio frequency (RF) signals emitted from respective elements of an antenna array, including:

receiving a RF signal emitted from one of a plurality of antenna elements of an antenna array;

detecting a phase shift in the received RF signal and in response thereto sampling the received RF signal to produce a RF signal sample;

repeating the detecting and sampling of the received RF signal to produce a plurality of RF signal samples, wherein said received RF signal includes a plurality of predetermined signal phase shifts and each one of the plurality of RF signal samples has associated therewith a signal phase relative to a signal phase of one or both of a prior RF signal sample and a subsequent RF signal sample;

measuring a signal phase difference between each one of the plurality of RF signal samples and one or both of the prior RF signal sample and the subsequent RF signal sample for comparison with one or more expected signal phase differences;

receiving another RF signal emitted from at least another portion of the plurality of antenna elements of the antenna array; and repeating, for the another received RF signal, the detecting and sampling and the measuring.

In accordance with another embodiment of the presently claimed invention, a method for enabling confirmation of expected phase shifts of radio frequency (RF) signals emitted from respective elements of an antenna array, comprising:

emitting a RF signal from one of a plurality of antenna elements of an antenna array of a device under test (DUT);

detecting a phase shift in the emitted RF signal and in response thereto sampling the emitted RF signal to produce a RF signal sample;

repeating the emitting, wherein subsequent ones of the repeated emitted RF signals have signal phases shifted by predetermined amounts from prior ones of the repeated emitted RF signals;

repeating the detecting and sampling of the repeated emitted RF signals, wherein each one of the plurality of RF signal samples has associated therewith a signal phase relative to a signal phase of one or both of a prior RF signal sample and a subsequent RF signal sample;

measuring a signal phase difference between each one of the plurality of RF signal samples and one or both of the prior RF signal sample and the subsequent RF signal sample for comparison with one or more expected signal phase differences;

emitting another RF signal from another one of the plurality of antenna elements of the antenna array; and repeating, for the another emitted RF signal, the detecting and sampling and the measuring.

DETAILED DESCRIPTION

Figure 1:
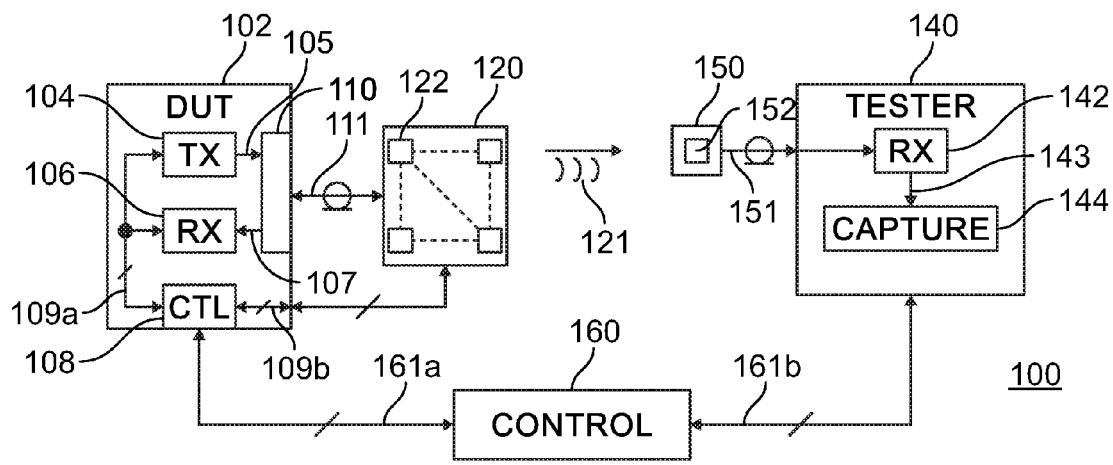
FIG. 1 depicts an over the air (OTA) test environment for detecting phase shifts of RF signals emitted from elements of an antenna array in accordance with exemplary embodiments of the presently claimed invention.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

The IEEE 802.11ad standard is intended to support short-distance communications of signals with a high data throughput at frequencies in the 60 GHz range. This technology is constrained to short distances because of high attenuation and atmospheric oxygen absorption. Furthermore, signals at 60 GHz tend to be more optical-like in behavior and are readily reflected by metallic surfaces and readily absorbed by non-metallic objects in their path. At distances of less than 10 meters, very high-throughput signals can be transferred between 802.11ad-compliant devices. However, omni-directional signal radiation, such as that used for 802.11n-compliant devices, do not provide reliable 60 GHz links due to the aforementioned signal attenuation, reflections and absorptions that conspire to make such links tenuous at best.

Consequently, the IEEE 802.11ad standard includes directional signal radiation via beamforming, with the 802.11ad network stack supporting discovery, beamforming optimization and high-throughput modulation. Unlike multiple-input, multiple-output (MIMO) systems which may use multiple antennas and multiple signal streams for higher speeds, 802.11ad devices make use of multiple antenna elements for beamforming. The 2 GHz bandwidth and orthogonal frequency division multiplexing (OFDM) modulation provides ample throughput for such applications as wireless cable replacement and high speed media file transfers between handheld devices without need of a network. When two 802.11ad compliant devices are establishing a link, they first cooperate to determine an optimal SNR signal path that may be produced by the individual element phase shifts and the interference effects of the signal radiated by each element upon signals radiated by the other elements.

A typical 802.11ad implementation allows the DUT to operate with a set of predefined phase shifter configurations. The phase shifting is typically determined during the design and development of the device under test (DUT), with the goal that all DUTs will exhibit the same set of beamforming configurations. While individual DUT manufacturing calibration is possible, the time necessary to achieve this would be cost prohibitive for mass produced devices. For example, it can take hours to test the full sphere of radiated signals from a DUT. Once the sphere is completed, it must be broken down into regions where a given phase shifter set works well. Therefore, this is typically only done for a few devices (e.g., for purposes of proving a new or revised design) and then later perhaps do an absolute calibration between different transmitters and thereafter rely on testing relative phase shifts only. Hence, it is important to ensure that such testing of relative phase shifts among all outputs is working properly.

This process of cooperating to determine an optimal SNR path depends on antenna elements having properly-operating phase-shift circuits, properly-operating controls of those phase-shift circuits, and resulting signals whose power is affected by those phase shifts within the standard-prescribed specifications. Accordingly, current testing confirms the ability of a DUT to control the phase shifting, will measure the phase-shift angle, and will determine if the power of the phase-shifted signal is within specification. For example, a 32-element antenna array, with multiple phase-shift increments typically requires numerous stop and go steps and device-tester control communications, as well as other factors that add to the test time.

Without degrading the integrity of such testing, it is possible to significantly reduce the test time. The key is to enable the test such that the DUT transmits a continuous wave (CW) signal while selectively switching the antenna element phase-shift circuits. The tester detects that CW signal and is triggered when it detects a phase shift to capture and store a portion of that signal. By capturing and storing signal portions preceding and following the detected phase shift, the tester can determine if a shift has occurred and the phase-shift angle, and compare signal power prior to and after phase-shift to determine if the output is still within specification. Hence, by triggering on phase shift occurrences while simply monitoring the CW signal and capturing snapshots of the signal leading and trailing such phase shift occurrences, reductions in test time are significant.

When transmitting from a single antenna element, especially with CW signal, signal power in unlikely to vary with different phase shifter settings. It is only necessary to confirm that the phase shift (e.g., in degrees) is within the expected range (e.g., +/−X degrees, where X is the potential variation to be expected). When this allowable phase variation X has been previously determined, the test criteria can be "pass or fail".

Referring to FIG. 1, a testing environment 100 for testing RF signal transmitters designed to perform beamforming in accordance with exemplary embodiments of the presently claimed invention includes the DUT 102, a tester 140 (e.g., similar to that discussed above) and a controller 160 (e.g., a personal computer), interconnected general as shown. The DUT 102 includes RF signal source circuitry 104 for providing the DUT transmit signals 105, and RF signal receiver circuitry 106 for receiving and processing the DUT receive signals 107. The transmit 105 and receive 107 signals are routed via signal routing circuitry 110 (e.g., RF switches) to and from a conductive RF signal connection 111 with an antenna array 120 having multiple antenna elements 122 (e.g., a planar matrix of 32 elements 122). The DUT 102 further includes internal control circuitry 108 which provides internal control signals 109a for controlling the RF signal source circuitry 104 and RF signal receiver circuitry 106, and external control signals 109b for controlling the individual phase shifts applied to the RF transmit signals 105 driving each antenna element 122 of the antenna array 120. Similarly, the controller 160 provides control signals 161a, 161b for the DUT 102 and tester 140.

The tester 140 includes, among other subsystems not particularly relevant to the presently claimed invention (and, therefore, not described here), receiver circuitry 142 for receiving and processing (e.g., frequency down converting and demodulating) the radiated signals 121 emitted by the individual antenna elements 122 of the antenna array 120 and received by at least one antenna element 152 of its antenna system 150 and conveyed by a conductive RF signal connection 151 therewith. As discussed in more detail below, samples of the processed receive signal 143 provided by the receiver circuitry 142 are captured and stored by signal data capture circuitry 144.

Hence, such a testing environment 100 enables testing of an 802.11ad-compliant DUT 102 having an integral or external antenna array 120 whose elements 122 each have associated therewith phase-shift circuitry (not shown) that can increment the phase-shift angle by a desired amount. The phase-shift subsystem is controlled via the antenna control signals 109b. Signals 121 are radiated from each element 122 based on its length, shape and position within the array 120. To test the operation of each antenna element 122 and its phase-shift subsystem, the signal 121 radiating from that element 122 is detected by the tester antenna 150, processed by the receiver circuitry 142 and sampled by the capture circuitry 144 (discussed in more detail below).

Such testing environments for testing RF transceivers are generally contained and operated, at least in part, in various forms of electromagnetically shielded enclosure. Examples of such shielded testing environments, including those in which antenna arrays are used to emit directional RF signal transmissions, are described in U.S. Pat. Nos. 8,811,461 and 8,917,761, and U.S. patent application Ser. Nos. 13/839,162, 13/839,583, 13/912,423, 14/461,573 and 15/197,966, the disclosures of which are incorporated herein by reference.

Figure 2:
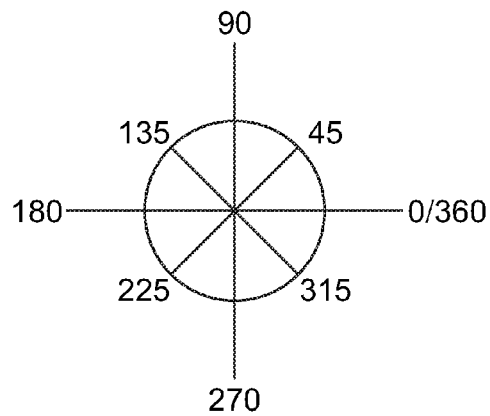
FIG. 2 depicts examples of predetermined signal phases imparted to a transmitted signal for use in detecting phase shifts of RF signals emitted from elements of an antenna array in accordance with exemplary embodiments of the presently claimed invention.

Referring to FIG. 2, monitoring a CW signal for occurrences of signal phase shifts in accordance with exemplary embodiments of the presently claimed invention can be introduced as follows. In this example as depicted, eight equidistant phase shifts are expected (45, 90, 135, 180, 225, 270, 315 and 360 degrees), though it will be readily appreciated that fewer or more phase shifts can be used, and that the phase shifts, while generally should be known a priori, need not necessarily be equidistant. When signal phase monitoring initially starts, it can be considered to have begun at zero phase 0. Accordingly, the first expected phase shift should be detected at 45, degrees, then 90 degrees, and so on, through the eighth shift of 360 degrees, which is also the starting phase of zero for the next sequence of phase shifts. Signal sampling (discussed below in more detail) occurs in response to detection of each phase shift. As a result, beginning with detection of the second phase shift (90 degrees) following detection of the first phase shift (45 degrees), triggering initiated by each phase shift will produce sets of samples of the signal before and after each phase shift. For example, responsive to detection of the first phase shift (45 degrees), the signal is sampled and stored, following which, responsive to detection of the second phase shift (90 degrees), the signal is sampled and stored, thereby producing a sample of the signal prior to the second phase shift (i.e., the sample responsive to detection of the first phase shift) and a sample of the signal after the second phase shift (i.e., the sample responsive to detection of the second phase shift). This is repeated with each successive detection of a phase shift.

The phase shifts being imparted are preferably predetermined and uniform in value, and done on a periodic basis or with another form of predetermined timing. However, they need not necessarily be known a priori, may be non-uniform in value and may have unknown or random timing.

Figure 3:
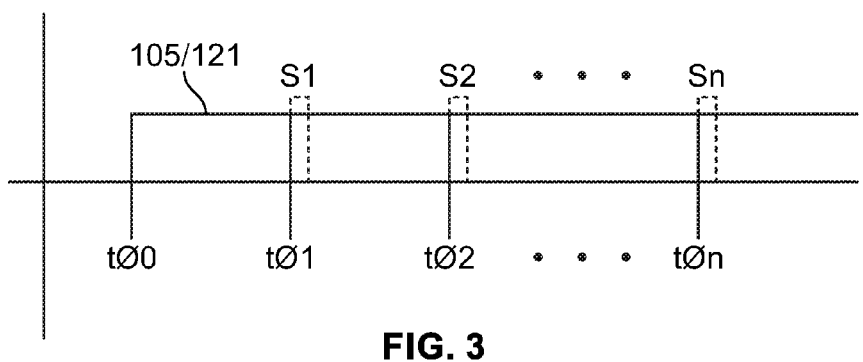
FIG. 3 depicts capturing of portions of a continuous wave (CW) RF signal in response to detections of phase shifts of RF signals emitted from elements of an antenna array in accordance with exemplary embodiments of the presently claimed invention.

Referring to FIG. 3, the DUT 102 generates a CW transmit signal 105 that is radiated 121 beginning at time t$\Phi$0. The tester 140 is receiving but not yet capturing the signal. Later, a phase shift is applied and detected at time t$\Phi$1 by the tester 140, in response to which the capture circuitry 144 captures a sample S1 of the signal. Thus, only a small portion S1 of the received CW signal is captured. Similarly, another phase shift is applied and detected at time t$\Phi$2 by the tester 140, in response to which the capture circuitry 144 captures another sample S2 of the signal. This process continues as additional phase shifts are applied and detected in response to which additional signal samples are captured. These signal samples can then be analyzed by the tester 140 (or by another signal data analysis subsystem) to determine the angular degree of shift and any change in signal output. To better enable such analysis, these signal samples also preferably include timestamps for their captures (e.g., a timestamp identifying time t$\Phi$1 associated with sample S1, a timestamp identifying time t$\Phi$2 associated with sample S2, and so on) to allow extrapolation of the relative phase for each signal capture. Alternatively, techniques other than timestamps can be used as well for enabling extrapolation of the relative phase of a new signal capture based on information about a prior signal capture.

Figure 4:
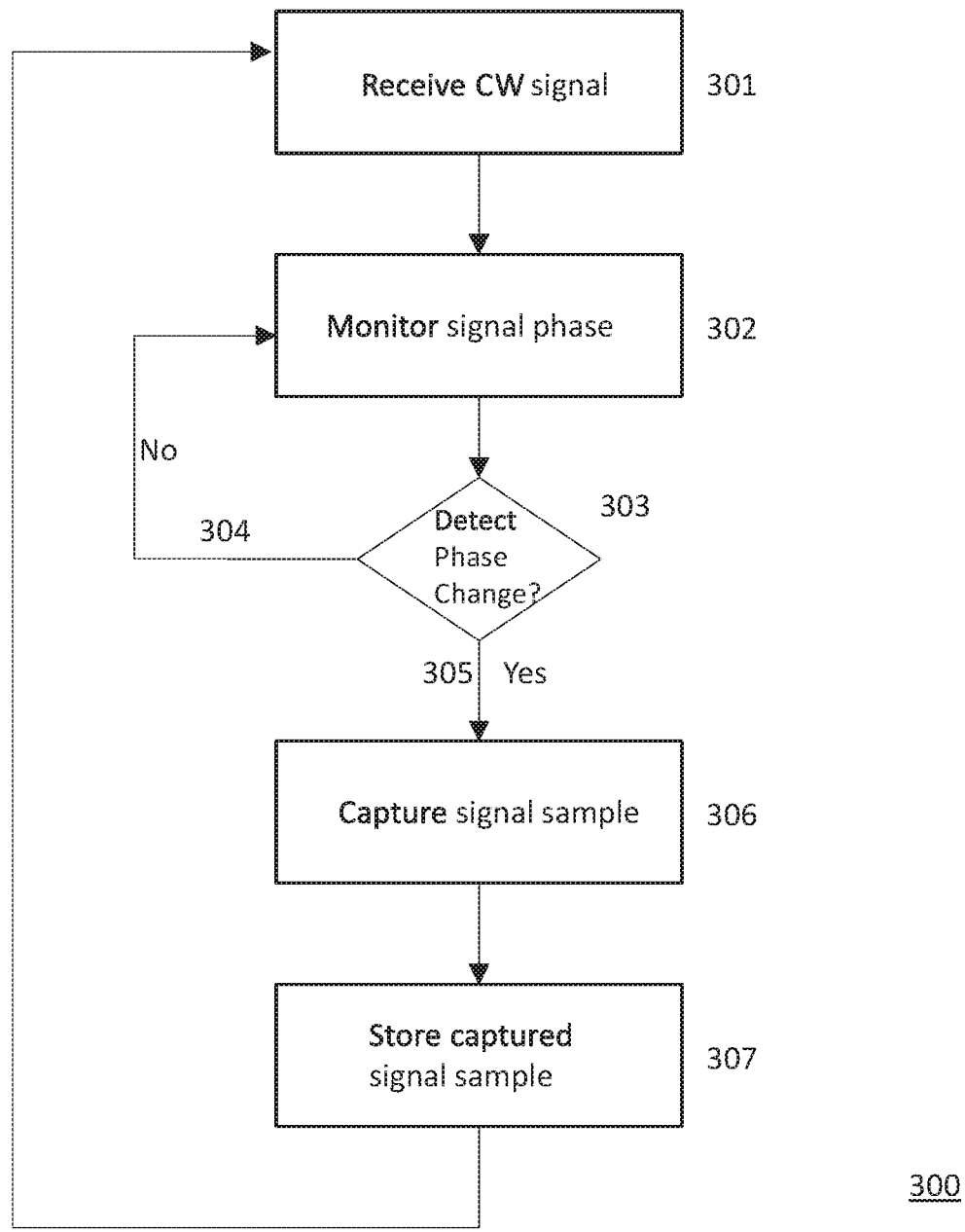
FIG. 4 is a flow chart summarizing steps of a method for capturing portions of a continuous wave (CW) RF signal in response to detections of phase shifts of RF signals emitted from elements of an antenna array in accordance with exemplary embodiments of the presently claimed invention.

Referring to FIG. 4, this testing method can be summarized in flow chart form as shown. The tester 140 receives a CW signal 301 from the DUT 102 and monitors its signal phase 302 as it awaits detection of a phase change 303. This monitoring continues 304 as the phases remains unchanged. When a phase change is detected 305, a sample of the signal is captured 306 and stored 307 for analysis. The system continues to receive 301 and monitor 302 the incoming CW signal and repeat the preceding actions.

This sequence as described and depicted is preferably performed for each element 122 of the antenna array 120 (FIG. 1). For example, the transmitted CW signal drives a first selected element 122 with sequential predetermined phase shifts applied and signal samples captured in response to phase shift detections, e.g., as described above. Following completion of signal emissions with all phase shifts, the transmitted CW signal is then switched to drive a second selected element 122, again with sequential predetermined phase shifts applied and signal samples captured in response to phase shift detections. This switching of the transmitted CW signal with varying signal phase shifts applied and responsive signal sampling is repeated until the desired number of antenna elements 122 (typically all) have been used.

Performing and repeating the sequences while transitioning the CW signal emissions from one antenna element 122 to another as described above can, potentially, result in no detectable phase differences (e.g., while there may be actual phase differences from one antenna element to another, they may be less than the predetermined threshold value needed to initiate a signal sample, or a portion of phase shift circuitry associated with the DUT antenna array 120 may be faulty), and thus no phase detection trigger(s) and responsive signal sampling(s). However, this seemingly anomalous or erroneous result can be determined by counting and comparing total numbers of phase shifts detected. Alternatively, to confirm whether the DUT does have a defective transit signal path (e.g., phase shifter, antenna element, etc.) or perhaps the actual phase shift is insufficient to cause a trigger, transmission by the DUT of the CW signal driving the second antenna element 122 can be started at a different absolute phase setting for its phase shifter such that a detectable phase shift is generated.

Figure 5:
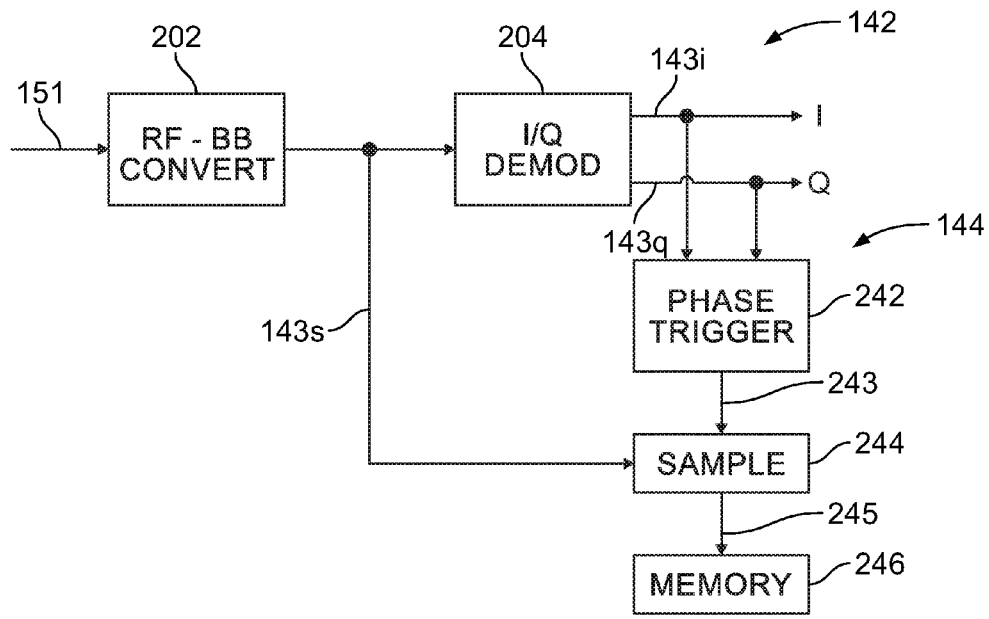
FIG. 5 depicts examples of the receiver and signal capture circuitry for use in the tester of FIG. 1.

Referring to FIG. 5, in accordance with an exemplary embodiment of the presently claimed invention, the receiver circuitry 142 (FIG. 1) includes conversion circuitry 202 and I/Q demodulation circuitry 204, and the capture circuitry 144 includes phase trigger circuitry 242, sampling circuitry 244 and memory 246. The conversion circuitry 202 converts the received RF signal 151 (e.g., via frequency down conversion) to a baseband signal, which is then demodulated by the I/Q demodulation circuitry 204 to extract the in-phase 143i and quadrature-phase 143q components I, Q of the incoming IEEE 802.11ad signal. The phase trigger circuitry 242 monitors the phase between the signal components 143i, 143q (discussed in more detail below) and produces a trigger signal 243 in response to detection of a phase change. The sampling circuitry 244, in response to the trigger signal 243, samples the converted incoming signal 143s and stores it in the memory 246 to be available for analysis.

Figure 6:
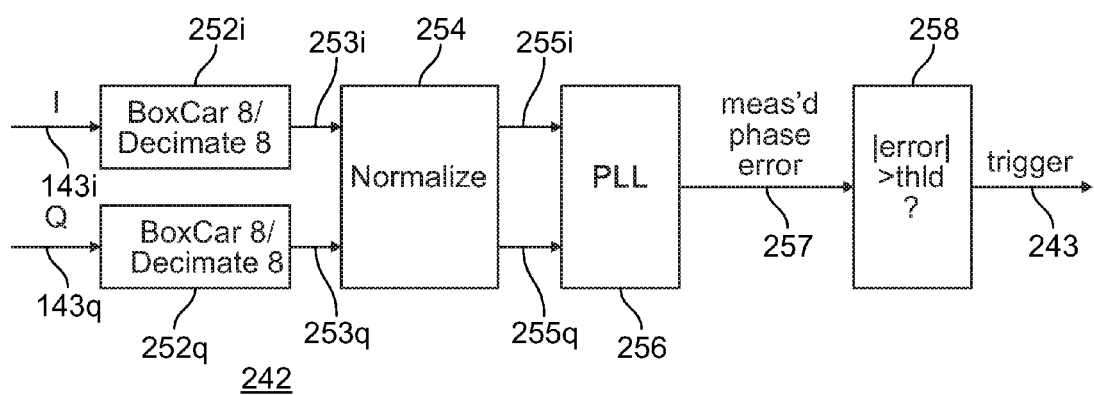
FIG. 6 depicts exemplary phase trigger circuitry for use in the signal capture circuitry of FIG. 5.

Referring to FIG. 6, in accordance with an exemplary embodiment of the presently claimed invention, the phase trigger circuitry 242 operates as follows. Following compensation and sampling at 2400 mega-samples per second (Msps), the incoming signal components I 143i, Q 143q are boxcar filtered and decimated by a factor of eight 252i, 252q (following which the remainder of the signal chain operates at 300 Msps). These decimated signal samples 253i, 253q are normalized 254 to a predetermined signal level, and the resulting normalized signal samples 255i, 255q are tracked by a phase-lock loop (PLL) 256. The PLL 256 monitors the normalized signal samples 255i, 255q and provides an error signal 257 that identifies if and when the nominal phase between the signal samples 255i, 255q changes. Following and during phase-lock, this error signal 257 has a nominal value of zero. Following and during a brief time interval until phase-lock re-occurs, this error signal 257 will have a non-zero value. When the absolute value of this non-zero value exceeds a predetermined threshold 258, the trigger signal 243 is asserted.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for enabling confirmation of expected phase shifts of radio frequency (RF) signals emitted from respective elements of an antenna array, comprising:
   receiving a RF signal emitted from one of a plurality of antenna elements of an antenna array;
   detecting a phase shift in said received RF signal and in response thereto sampling said received RF signal to produce a RF signal sample;
   repeating said receiving and said detecting and sampling to produce a plurality of RF signal samples, wherein said received RF signal includes a plurality of predetermined signal phase shifts and each one of said plurality of RF signal samples has associated therewith a signal phase relative to a signal phase of one or both of a prior RF signal sample and a subsequent RF signal sample; and
   measuring a signal phase difference between each one of said plurality of RF signal samples and one or both of said prior RF signal sample and said subsequent RF signal sample for comparison with one or more expected signal phase differences.

2. The method of claim 1, wherein said receiving a RF signal emitted from at least a portion of a plurality of antenna elements of an antenna array comprises receiving a continuous wave (CW) RF signal.

3. The method of claim 1, wherein said receiving a RF signal emitted from one of a plurality of antenna elements of an antenna array comprises receiving a periodically phase shifted RF signal.

4. The method of claim 1, wherein:
   said RF signal includes at least first and second signal components having first and second signal phases separated by a phase difference; and
   said detecting a phase shift in said received RF signal comprises detecting a change in said phase difference between said first and second signal phases.

5. The method of claim 1, wherein:
   said RF signal comprises at least first and second signal components having first and second signal phases separated by a phase difference; and
   said detecting a phase shift in said received RF signal and in response thereto sampling said received RF signal comprises detecting said phase difference and sampling said received RF signal when said detected phase difference exceeds a predetermined value.

6. The method of claim 1, further comprising:
   receiving another RF signal emitted from another one of said plurality of antenna elements of said antenna array;
   detecting a phase shift in said another received RF signal and in response thereto sampling said another received RF signal to produce another RF signal sample;
   repeating said receiving and said detecting and sampling to produce another plurality of RF signal samples, wherein said received RF signal includes a plurality of predetermined signal phase shifts and each one of said another plurality of RF signal samples has associated therewith another signal phase relative to a signal phase of one or both of a prior RF signal sample and a subsequent RF signal sample; and
   measuring a signal phase difference between each one of said plurality of RF signal samples and one or both of said prior RF signal sample and said subsequent RF signal sample for comparison with one or more expected signal phase differences.

7. The method of claim 6, wherein:
   said receiving a RF signal emitted from one of a plurality of antenna elements of an antenna array comprises receiving a continuous wave (CW) RF signal; and
   said receiving another RF signal emitted from another one of a plurality of antenna elements of said antenna array comprises receiving another continuous wave (CW) RF signal.

8. The method of claim 6, wherein:
   said receiving a RF signal emitted from one of a plurality of antenna elements of an antenna array comprises receiving a periodically phase shifted RF signal; and
   said receiving another RF signal emitted from another one of a plurality of antenna elements of said antenna array comprises receiving another periodically phase shifted RF signal.

9. The method of claim 6, wherein:
   said RF signal includes at least first and second signal components having first and second signal phases separated by a phase difference;
   said detecting a phase shift in said received RF signal comprises detecting a change in said phase difference between said first and second signal phases;
   said another RF signal includes at least third and fourth signal components having third and fourth signal phases separated by another phase difference; and said detecting a phase shift in said another received RF signal comprises detecting a change in said another phase difference between said third and fourth signal phases.

10. The method of claim 6, wherein:

said RF signal comprises at least first and second signal components having first and second signal phases separated by a phase difference;

said detecting a phase shift in said received RF signal and in response thereto sampling said received RF signal comprises detecting said phase difference and sampling said received RF signal when said detected phase difference exceeds a predetermined value;

said another RF signal comprises at least third and fourth signal components having third and fourth signal phases separated by another phase difference; and said detecting a phase shift in said another received RF signal and in response thereto sampling said another received RF signal comprises detecting said another phase difference and sampling said another received RF signal when said another detected phase difference exceeds another predetermined value.

11. A method for enabling confirmation of expected phase shifts of radio frequency (RF) signals emitted from respective elements of an antenna array, comprising:

receiving a RF signal emitted from one of a plurality of antenna elements of an antenna array;

detecting a phase shift in said received RF signal and in response thereto sampling said received RF signal to produce a RF signal sample;

repeating said receiving and said detecting and sampling to produce a plurality of RF signal samples, wherein said received RF signal includes a plurality of predetermined signal phase shifts and each one of said plurality of RF signal samples has associated therewith a signal phase relative to a signal phase of one or both of a prior RF signal sample and a subsequent RF signal sample;

measuring a signal phase difference between each one of said plurality of RF signal samples and one or both of said prior RF signal sample and said subsequent RF signal sample for comparison with one or more expected signal phase differences;

receiving another RF signal emitted from another one of said plurality of antenna elements of said antenna array; and repeating, for said another received RF signal, said detecting and sampling and said measuring.

12. The method of claim 11, wherein:

said receiving a RF signal emitted from one of a plurality of antenna elements of an antenna array comprises receiving a continuous wave (CW) RF signal; and said receiving another RF signal emitted from another one of a plurality of antenna elements of said antenna array comprises receiving another continuous wave (CW) RF signal.

13. The method of claim 11, wherein:

said receiving a RF signal emitted from one of a plurality of antenna elements of an antenna array comprises receiving a periodically phase shifted RF signal; and said receiving another RF signal emitted from another one of a plurality of antenna elements of said antenna array comprises receiving another periodically phase shifted RF signal.

14. The method of claim 11, wherein:

said RF signal includes at least first and second signal components having first and second signal phases separated by a phase difference;

said detecting a phase shift in said received RF signal comprises detecting a change in said phase difference between said first and second signal phases;

said another RF signal includes at least third and fourth signal components having third and fourth signal phases separated by another phase difference; and said detecting a phase shift in said another received RF signal comprises detecting a change in said another phase difference between said third and fourth signal phases.

15. The method of claim 11, wherein:

said RF signal comprises at least first and second signal components having first and second signal phases separated by a phase difference;

said detecting a phase shift in said received RF signal and in response thereto sampling said received RF signal comprises detecting said phase difference and sampling said received RF signal when said detected phase difference exceeds a predetermined value;

said another RF signal comprises at least third and fourth signal components having third and fourth signal phases separated by another phase difference; and said detecting a phase shift in said another received RF signal and in response thereto sampling said another received RF signal comprises detecting said another phase difference and sampling said another received RF signal when said another detected phase difference exceeds another predetermined value.

16. A method for enabling confirmation of expected phase shifts of radio frequency (RF) signals emitted from respective elements of an antenna array, comprising:

emitting a RF signal from one of a plurality of antenna elements of an antenna array of a device under test (DUT);

detecting a phase shift in said emitted RF signal and in response thereto sampling said emitted RF signal to produce a RF signal sample;

repeating said emitting, wherein subsequent ones of said repeated emitted RF signals have signal phases shifted by predetermined amounts from prior ones of said repeated emitted RF signals;

repeating said detecting and sampling of said repeated emitted RF signals, wherein each one of said plurality of RF signal samples has associated therewith a signal phase relative to a signal phase of one or both of a prior RF signal sample and a subsequent RF signal sample;

measuring a signal phase difference between each one of said plurality of RF signal samples and one or both of said prior RF signal sample and said subsequent RF signal sample for comparison with one or more expected signal phase differences;

emitting another RF signal from another one of said plurality of antenna elements of said antenna array; and repeating, for said another emitted RF signal, said detecting and sampling and said measuring.

17. The method of claim 16, wherein:

said emitting a RF signal from one of a plurality of antenna elements of an antenna array comprises emitting a continuous wave (CW) RF signal; and said emitting another RF signal from another one of a plurality of antenna elements of said antenna array comprises emitting another continuous wave (CW) RF signal.

18. The method of claim 16, wherein:
said emitting a RF signal from one of a plurality of antenna elements of an antenna array comprises emitting a periodically phase shifted RF signal; and
said emitting another RF signal from another one of a plurality of antenna elements of said antenna array comprises emitting another periodically phase shifted RF signal.

19. The method of claim 16, wherein:
said RF signal includes at least first and second signal components having first and second signal phases separated by a phase difference;
said detecting a phase shift in said received RF signal comprises detecting a change in said phase difference between said first and second signal phases;
said another RF signal includes at least third and fourth signal components having third and fourth signal phases separated by another phase difference; and
said detecting a phase shift in said another received RF signal comprises detecting a change in said another phase difference between said third and fourth signal phases.

20. The method of claim 16, wherein:
said RF signal comprises at least first and second signal components having first and second signal phases separated by a phase difference;
said detecting a phase shift in said received RF signal and in response thereto sampling said received RF signal comprises detecting said phase difference and sampling said received RF signal when said detected phase difference exceeds a predetermined value;
said another RF signal comprises at least third and fourth signal components having third and fourth signal phases separated by another phase difference; and
said detecting a phase shift in said another received RF signal and in response thereto sampling said another received RF signal comprises detecting said another phase difference and sampling said another received RF signal when said another detected phase difference exceeds another predetermined value.

* * * * *